United States Patent
Smith

(10) Patent No.: US 6,446,437 B1
(45) Date of Patent: Sep. 10, 2002

(54) FUEL SYSTEM

(75) Inventor: Trevor Stanley Smith, Sutton Coldfield (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/476,857

(22) Filed: Jan. 3, 2000

(30) Foreign Application Priority Data

Jan. 6, 1999 (GB) .............................................. 9900115

(51) Int. Cl.[7] .................................................. F02C 1/00
(52) U.S. Cl. ........................ 60/734; 123/510; 60/39.091
(58) Field of Search .............................. 123/510, 385, 123/386, 387; 60/39.094, 734, 736, 39.281, 39.091

(56) References Cited

U.S. PATENT DOCUMENTS

| 3,103,229 A | * | 9/1963 | Smith ....................... 60/39.094 |
| 4,334,406 A | * | 6/1982 | Todd ............................ 60/223 |
| 4,578,945 A | * | 4/1986 | Peck et al. ................ 60/39.281 |
| 5,116,362 A | * | 5/1992 | Arline et al. .................. 60/734 |
| 5,156,001 A | | 10/1992 | Mouton |
| 5,159,808 A | * | 11/1992 | Kast ......................... 60/39.091 |
| 5,203,174 A | * | 4/1993 | Meyer .......................... 60/736 |
| 5,209,058 A | * | 5/1993 | Sparks et al. ............. 60/39.281 |
| 5,251,440 A | * | 10/1993 | Bong-dong et al. .......... 60/329 |
| 5,513,493 A | | 5/1996 | Severn et al. |

FOREIGN PATENT DOCUMENTS

| EP | 0886054 | 12/1998 |
| GB | 2289722 | 5/1995 |

* cited by examiner

*Primary Examiner*—Carl S. Miller
(74) *Attorney, Agent, or Firm*—Gottlieb, Rackman & Reisman, P.C.

(57) ABSTRACT

A fuel system comprising a low pressure fuel pump having an outlet which is connected to an inlet of a high pressure pump arranged, in use, to supply fuel to an engine. The fuel system her comprises at least one actuator controlled by a servo-valve, wherein the servo-valve has a high pressure connection connected to the high pressure side of the high pressure pump and a low pressure connection connected upstream of the outlet of the low pressure pump.

9 Claims, 2 Drawing Sheets

FUEL SYSTEM

This invention relates to a fuel system, and in particular to a fuel system suitable for use in aerospace applications.

Figure 1:
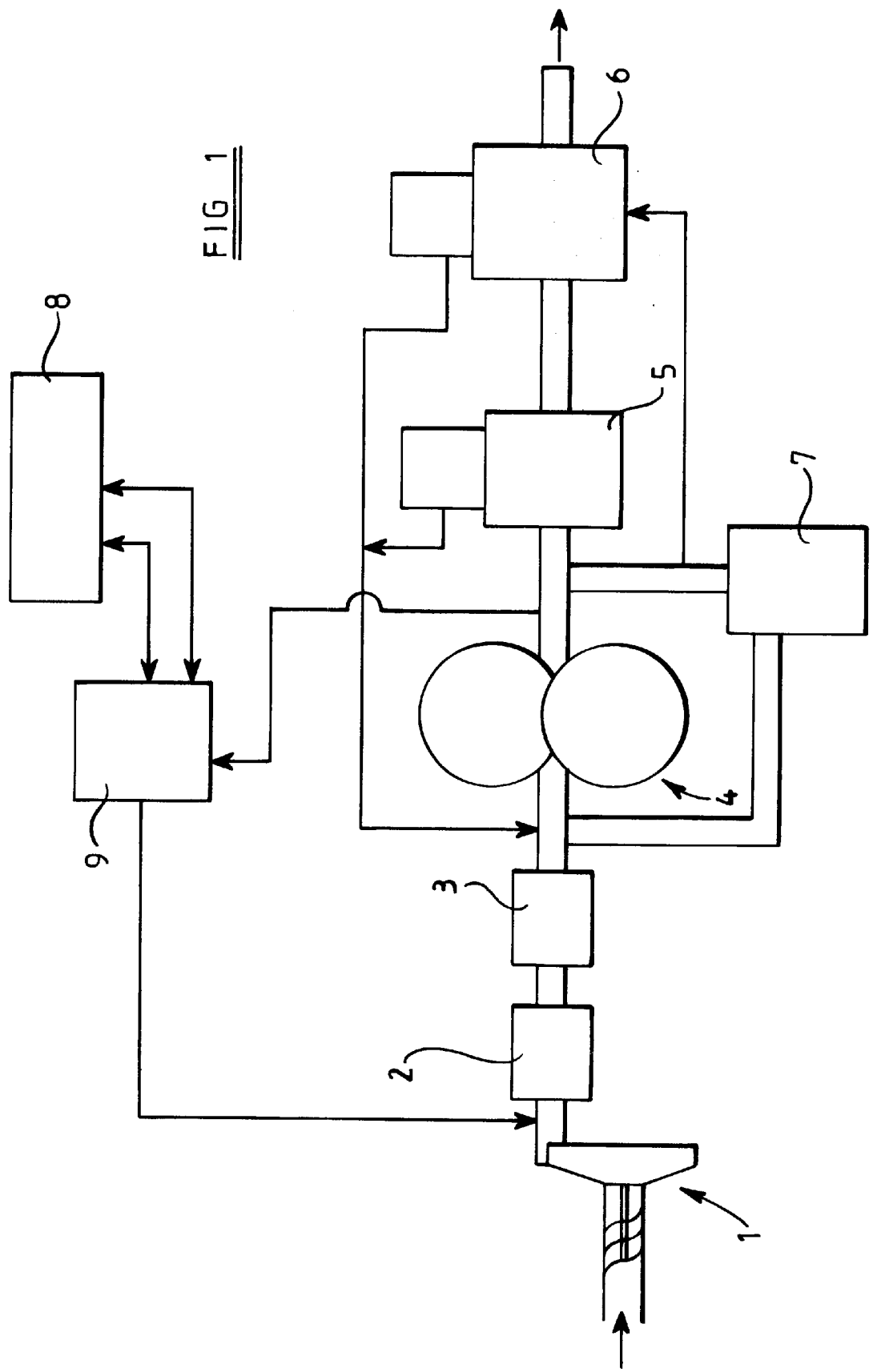

FIG. 1 illustrates, diagrammatically, an aircraft engine fuel system which comprises an impellor pump 1 arranged to supply fuel from a relatively low pressure fuel source through a heat exchanger 2 and filter 3 to a high pressure gear pump 4. The high pressure gear pump 4 is typically arranged to increase the fuel pressure by over 200 psi. From the gear pump 4, fuel is supplied through a metering valve 5 and a pressure raising and shut off valve 6 to an engine. A spill valve is 7 arranged to return excess fuel to the inlet of the gear pump 4.

One or more variable stator vane actuators 8 are arranged to control the operation of various components of the aircraft engine. The actuators 8 are controlled by a servo-valve 9. The servo-valve 9 is arranged to receive fuel under pressure from the outlet of the gear pump 4, a return line from the servo-valve 9 being connected to the inlet side of the pump 4. In order to ensure that the servo-valve 9 and the actuators 8 operate correctly, it is important to ensure that the fuel pressure difference across the servo-valve 9 exceeds a predetermined pressure which is determined by, for example, the size of the actuators, and is typically of the order of 100 psi minimum. Where the gear pump 4 increases the fuel pressure by over 200 psi, then clearly the fuel pressure difference across the servo-valve 9 is sufficient to ensure that the servo-valve 9 and actuators 8 operate correctly.

It is desirable to reduce the number of heat exchangers used in aerospace systems, for example by omitting the oil/air heat exchangers used to cool the gearboxes and electrical generators associated with the engines, instead relying upon the oil/fuel heat exchangers to achieve such cooling. As the high pressure rise gear pumps used in the typical arrangements generate significant levels of heat, in order to allow the heat exchangers to remove as much heat as possible it is desirable to replace the high pressure gear rise pumps with units having a smaller pressure rise at low metered fuel flow rates to the engine, which generate less heat. As a result of the omission of one or more heat exchangers, a significant weight reduction can be made.

The use of a lower pump pressure rise may result in the fuel pressure difference across the servo-valve being insufficient to ensure that the servo-valve and actuators operate correctly, particularly when the engine, and hence the gear pump, is operating at low fuel flow rates and hence the gear pump spill (recirculation) flow rate is high. Although the dimensions of the servo-valve and the actuators can be increased to reduce the pressure necessary to achieve correct operation, such alterations to these components may result in them being unsuitable for use in aerospace applications due to their size and weight.

It is an object of the invention to provide a fuel system including a high pressure pump in which this disadvantage is obviated or mitigated.

According to the present invention there is provided a fuel system comprising a low pressure fuel pump having an outlet which is connected to the inlet of a high pressure pump arranged, in use, to supply fuel to an engine, and at least one actuator controlled by a servo-valve, the servo-valve having a high pressure connection connected to the high pressure side of the high pressure pump and a low pressure connection connected upstream of the outlet of the low pressure pump.

As the low pressure connection of the servo-valve is connected upstream of the outlet of the low pressure pump rather than to the low pressure side of the high pressure pump, a pressure difference can be achieved across the servo-valve which is greater than the pressure rise generated by the high pressure pump. It will be appreciated, therefore, that a high pressure pump arranged to produce a lower minimum pressure rise may be used without impairing the performance of the servo-valve and associated actuators.

The high pressure pump conveniently comprises a gear pump.

In order to reduce the risk of hot fuel within the low pressure connection vapourising, which may result in the low pressure pump becoming vapour-locked if it takes the form of an impellor pump, a cooling flow of fuel may be supplied to the low pressure connection from the low pressure side of the high pressure pump before any series heat exchanger. In order to avoid vaporisation in the part of the low pressure connection upstream of the part receiving the cooling flow, a valve may be provided in the low pressure connection, the valve maintaining the fuel pressure at a level sufficient to ensure that vaporisation does not occur. Alternatively, the low pressure connection may be connected to a part of the low pressure pump in which the fuel pressure is at a level intermediate the inlet and outlet pressures of the low pressure pump and sufficient to avoid vaporisation of fuel.

Figure 2:
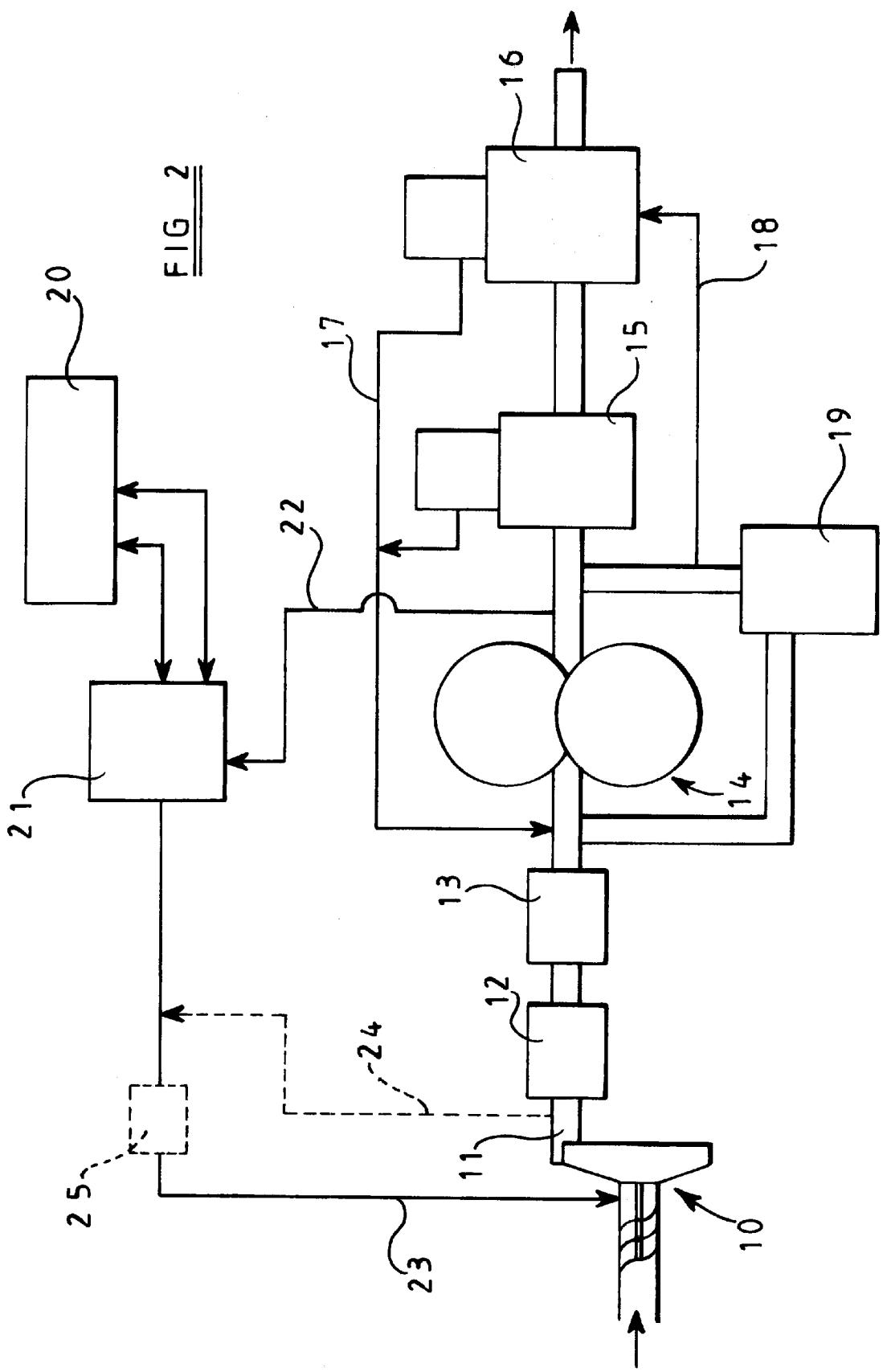

The invention will further be described, by way of example, with reference to the accompanying drawings, in which:

FIG. 1 is a diagrammatic view of a typical fuel system as described hereinbefore; and FIG. 2 is a view similar to FIG. 1 illustrating a fuel system in accordance with an embodiment of the invention.

The fuel system illustrated in FIG. 2 is similar to that of FIG. 1 and comprises a low pressure impellor pump 10 which is arranged to receive fuel from the outlet of a fuel tank lift pump, and is arranged to raise the fuel pressure from approximately 30 psi by between 60 and 180 psi depending upon the engine operating conditions. For example, when the engine is operating at ground idle speed, the impellor pump will increase the fuel pressure by approximately 60 psi, the impellor pump 10 increasing the fuel pressure by approximately 90 psi whilst the engine is at in flight idling speed, and the impellor pump 10 increasing the fuel pressure by approximately 180 psi when the engine is operating under takeoff or climb engine speeds.

The outlet of the impellor pump 10 is connected to a passage 11 which, in turn, is connected to a heat exchanger 12. The heat exchanger 12 is arranged to cool the oil used in the gearboxes and electrical generators associated with the engine, the heat removed from the oil being applied to the fuel. During the critical phase of normal operating conditions, it is thought that the heat exchanger 12 will increase the fuel temperature by a significant amount. In some circumstances, the temperature may be raised by 100° C. or more. The outlet of the heat exchanger 12 is connected to a fuel filter 13 arranged to remove particulate contaminants from the flow of fuel. Fuel from the filter 13 is supplied to the inlet of a high pressure pump 14 in the form of a gear pump. The outlet of the gear pump 14 is connected to a metering valve 15 arranged to control the rate at which fuel is supplied to the engine, and to a pressure raising and shut-off valve 16 which is arranged to ensure that fuel is delivered to the engine at a pressure exceeding a predetermined minimum pressure. As illustrated, any fuel acting as servo flow to control the metering valve 15 or the pressure raising and shut-off valve 16 is returned to the inlet side of the gear pump 14 through a return passage 17. Further, fuel under pressure is supplied to the pressure raising and shut-off valve 16 through a supply line 18 in order to allow correct operation of the pressure raising and shut-off valve 16. A spill valve 19 is arranged in parallel with the gear pump 14 to permit excess fuel to be returned to the inlet side of the gear pump 14 in a conventional manner.

The pressure raising valve 16 is arranged to limit the fuel pressure rise across the gear pump 14 to approximately 50 psi when the engine is operating at low fuel flow rates. As the engine fuel flow rate increases, then the pressure increase achieved by the gear pump 14 will also increase.

As in the typical arrangement, one or more actuators 20 are provided to control various aspects of the operation of the engine or other related components of the aircraft. The actuators 20 are controlled using a servo-valve 21 which includes a high pressure connection line 22 connected to the high pressure side of the gear pump 14, and a low pressure connection line 23 which, in accordance with the invention, is connected to a part of the low pressure pump 10 upstream of the outlet thereof and in which the fuel pressure is intermediate the fuel pressure at the inlet and outlet of the low pressure pump 10.

A restricted flow passage 24 may be provided between the passage 11 which communicates with the outlet of the low pressure pump 10 and part of the low pressure connection line 23. As the fuel pressure within the low pressure connection line 23 is less than that at the outlet of the low pressure pump 10, it will be appreciated that fuel is permitted to flow at a restricted rate from the passage 11 to the low pressure connection line 23, and as this fuel has not passed through the heat exchanger 12, it is relatively cool and serves to cool the fuel flowing within the low pressure connection line 23.

In use, fuel is supplied by the low pressure pump 10 through the heat exchanger 12 and filter 13 to the gear pump 14. The gear pump 14 pressurises the fuel and supplies the fuel through the metering valve 15 and pressure raising and shut-off valve 16 to the engine. Excess fuel supplied by the gear pump 14 is returned to the inlet side thereof through the spill valve 19. Fuel under pressure is also supplied through the high pressure connection line 22 to the servo-valve 21, and the servo-valve 21 is connected through the low pressure connection line 23 to a source of fuel at relatively low pressure, i.e. a part of the low pressure pump 10 upstream of the outlet thereof. It will be appreciated that such connection of the low pressure connection line 23 results in the pressure difference between the high pressure connection line 22 and the low pressure connection line 23 being greater than the pressure rise generated by the gear pump 14. As a result, even though the gear pump 14 is arranged to raise the fuel pressure by only a relatively small amount when operating at low engine fuel flow rates, a sufficient pressure difference can be applied to the servo-valve 21 to result in correct operation of the servo-valve 21 and actuators 20.

Where the heat exchanger 12 is used to cool the oil used in the gearboxes and electrical generators associated with the engine, then the fuel at the outlet of the gear pump 14 which subsequently flows to the low pressure connection line 23 will be hot, and there is the risk that the temperature of the fuel within the low pressure connection line 23 will be sufficiently high that the fuel therein may vaporise. Such vaporisation is particularly disadvantageous as it may result in the low pressure impellor pump 10 becoming vapour locked. In order to reduce the risk of such vaporisation, the passage 24 may supply a cooling flow of fuel to the low pressure connection line 23, reducing the fuel temperature therein. As a result, the risk of vaporisation is reduced.

As an additional measure to reduce the risk of vaporisation, as described hereinbefore, the low pressure connection line 23 is connected to a part of the low pressure pump 10 within which the fuel pressure is intermediate the inlet and outlet pressures thereof. The part of the low pressure pump 10 to which the low pressure connection line 23 is connected, is chosen to ensure that the fuel pressure within the low pressure connection line 23 is at a sufficiently high level that the risk of vaporisation of fuel is reduced.

In an alternative arrangement, the low pressure connection line 23 may be provided with a valve 25 which restricts the rate of fuel flow along the low pressure connection line 23, increasing the fuel pressure within the part of the low pressure connection line 23 upstream of the valve 25 to a level sufficient to ensure that fuel vaporisation does not occur, or to reduce the risk of fuel vaporisation to an acceptable level. Where a cooling flow of fuel is provided, the valve 25 is conveniently located to pressurise the low pressure connection line 23 which is cooled by the flow of fuel to the line 23 from the passage 24.

Where the fuel pressure within the low pressure connection line 23 is raised using either of the techniques discussed hereinbefore, it is important to ensure that the fuel pressure within the low pressure connection line 23 is sufficiently low that the pressure difference across the servo-valve 21 is sufficient to ensure that the actuators 20 and servo-valve 21 operate correctly throughout the range of operating conditions of the engine.

I claim:

1. A fuel system comprising a low pressure fuel pump having an outlet which is connected to an inlet of a high pressure pump arranged, in use, to supply fuel to an engine, said high pressure pump having a high pressure side and a low pressure side, said fuel system comprising at least one actuator controlled by a servo-valve, said servo-valve having a high pressure connection connected to said high pressure side of said high pressure pump and a low pressure connection connected upstream of said outlet of said low pressure pump, said high pressure pump supplying fuel at high pressure to said engine and said servo-valve at all times during engine operation and throughout a full range of engine operating conditions from startup to shutdown.

2. The fuel system as claimed in claim 1, wherein said high pressure pump comprises a gear pump.

3. The fuel system as claimed in claim 1, wherein said low pressure pump takes the form of an impeller pump.

4. The fuel system as claimed in claim 1, further comprising a passage for supplying a cooling flow of fuel to said low pressure connection from said low pressure side of said high pressure pump.

5. The fuel system as claimed in claim 4, further comprising a heat exchanger, wherein said passage for supplying a cooling flow of fuel to said low pressure connection supplies fuel from said low pressure side of said high pressure pump before said heat exchanger.

6. The fuel system as claimed in claim 4, comprising a restricted passage for supplying a cooling flow of fuel to said low pressure connection.

7. The fuel system as claimed in claim 4, said low pressure pump having an inlet pressure and an outlet pressure, wherein said low pressure connection is connected to a part of said low pressure pump in which fuel pressure is at a level intermediate said inlet and outlet pressures of said low pressure pump.

8. The fuel system as claimed in claim 4, further comprising a valve provided in said low pressure connection in a position downstream of a part of said low pressure connection receiving said cooling flow, said valve serving to maintain fuel pressure at a level sufficient to ensure that vaporisation does not occur.

9. A method of supplying fuel to an engine via a fuel system, said method comprising supplying fuel to a low pressure fuel pump having an outlet, supplying fuel from the low pressure pump outlet to an inlet of a high pressure pump having a high pressure side and a low pressure side, connecting the high pressure side of the high pressure pump to a servo-valve for controlling an actuator, said servo-valve having a low pressure connection, connecting the low pressure connection of said servo-valve upstream of said outlet of said low pressure pump, and supplying fuel at high pressure to said engine and to said servo-valve from the high pressure pump at all times during engine operation and throughout a full range of engine operating conditions from start-up to shutdown.

* * * * *